United States Patent
Nisisako

(10) Patent No.: US 9,200,938 B2
(45) Date of Patent: Dec. 1, 2015

(54) MICRODROPLET-PRODUCING APPARATUS

(75) Inventor: Takasi Nisisako, Yokohama (JP)

(73) Assignee: Toyota Institute of Technology, Tokyo (JP)

( * ) Notice: Subject to any disclaimer, the term of this patent is extended or adjusted under 35 U.S.C. 154(b) by 210 days.

(21) Appl. No.: 13/261,564

(22) PCT Filed: Jul. 13, 2011

(86) PCT No.: PCT/JP2011/066004
§ 371 (c)(1),
(2), (4) Date: Jan. 10, 2013

(87) PCT Pub. No.: WO2012/008497
PCT Pub. Date: Jan. 19, 2012

(65) Prior Publication Data
US 2013/0129581 A1    May 23, 2013

(30) Foreign Application Priority Data
Jul. 13, 2010   (JP) .................................. 2010-158988

(51) Int. Cl.
*B01L 3/00*  (2006.01)
*G01F 11/28* (2006.01)
(Continued)

(52) U.S. Cl.
CPC .............. *G01F 11/28* (2013.01); *B01F 3/0807* (2013.01); *B01F 13/0062* (2013.01); *B01F 15/024* (2013.01); *B01J 13/04* (2013.01); *B01J 2219/00783* (2013.01); *B01J 2219/00786* (2013.01); *B01J 2219/00903* (2013.01)

(58) Field of Classification Search
CPC .............. B01F 3/0865; B01F 13/0069; B01F 2004/0834; G01N 33/80; B01L 22/01
USPC ................................................... 422/506, 503
See application file for complete search history.

(56) References Cited

U.S. PATENT DOCUMENTS 5,358,614 A *  10/1994   Scott et al. ..................... 204/563
6,387,301 B1 *  5/2002   Nakajima et al. .............. 264/4.4
(Continued)

FOREIGN PATENT DOCUMENTS

| JP | 2003-103152 A | 4/2003 |
| JP | 2004-237177 A | 8/2004 |

(Continued)

*Primary Examiner* — Jill Warden
*Assistant Examiner* — Brittany Fisher
(74) *Attorney, Agent, or Firm* — Foley & Lardner LLP

(57) ABSTRACT

The present invention provides an apparatus for producing micro liquid drops through fine channels which can produce a large amount of micro liquid drops at low costs in an efficient manner. The apparatus for producing micro liquid drops according to the present invention includes a fine channel substrate and a holder for holding the fine channel substrate. The fine channel substrate has a micro liquid drop discharge outlet formed at the center thereof; a plurality of micro liquid drop producing sections which are connected to the micro liquid drop discharge outlet via the fine channels and disposed on the respective circumference of M circles or polygons arranged around the micro liquid drop discharge outlet; first-liquid drawing inlets which are disposed on the circumference of a circle or polygon arranged around the micro liquid drop discharge outlet; up-to-Nth-liquid drawing inlets (N is an integer equal to two or greater, M≤N−1) which are disposed on the respective circumference of circles or polygons arranged sequentially outward; and the fine channels through which the first- to Nth-liquids are supplied to the plurality of micro liquid drop producing sections. The holder for holding the fine channel substrate has a multi-pipe structure which includes N annular channels for distributing an equal flow of the first- to Nth-liquids to the drawing inlet for each liquid in the fine channel substrate.

4 Claims, 16 Drawing Sheets

(51) Int. Cl.
*B01F 3/08* (2006.01)
*B01F 13/00* (2006.01)
*B01F 15/02* (2006.01)
*B01J 13/04* (2006.01)

(56) References Cited

U.S. PATENT DOCUMENTS

| | | |
|---|---|---|
| 7,338,641 B2 | 3/2008 | Kawai et al. |
| 2004/0027915 A1* | 2/2004 | Lowe et al. .................... 366/341 |
| 2004/0125689 A1* | 7/2004 | Ehrfeld et al. .............. 366/165.1 |
| 2004/0213083 A1 | 10/2004 | Fujiwara et al. |
| 2006/0275180 A1* | 12/2006 | Koide et al. ................... 422/100 |
| 2007/0196397 A1 | 8/2007 | Torii et al. |
| 2008/0223720 A1* | 9/2008 | Yamanaka et al. ............ 204/451 |
| 2009/0286300 A1* | 11/2009 | Le Vot et al. .................. 435/177 |

FOREIGN PATENT DOCUMENTS

| | | |
|---|---|---|
| JP | 2004-243308 A | 9/2004 |
| JP | 2004-344877 A | 12/2004 |
| JP | 2006-320772 A | 11/2006 |
| WO | WO 2005/089921 A1 | 9/2005 |
| WO | WO 2007/026564 A1 | 3/2007 |

* cited by examiner

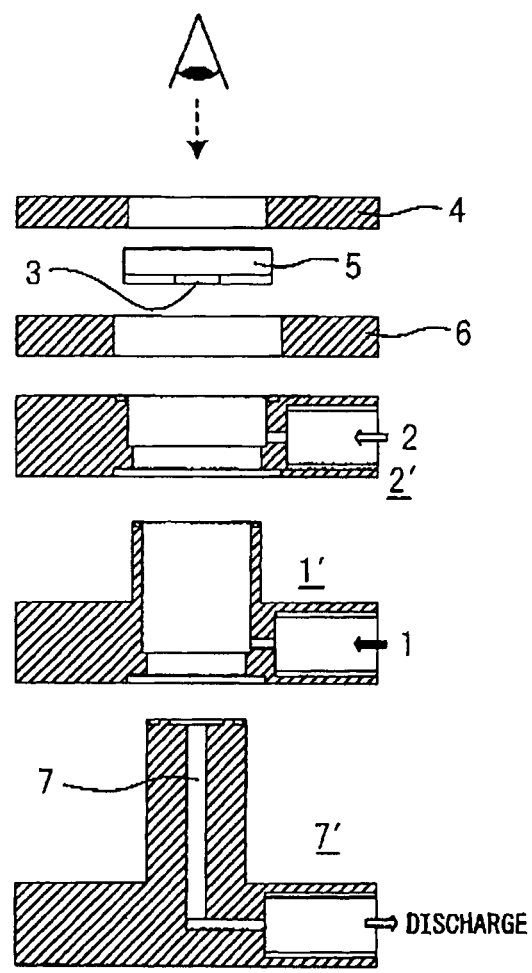

Fig. 11
(a)
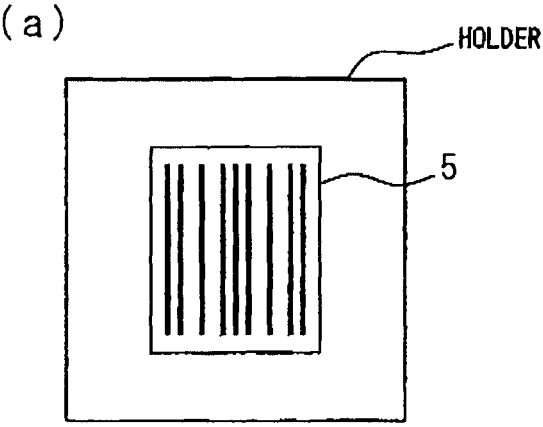
(b)
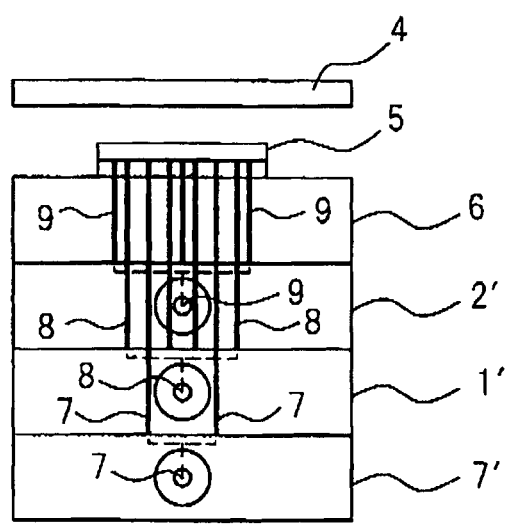

US 9,200,938 B2

MICRODROPLET-PRODUCING APPARATUS

CROSS-REFERENCE TO RELATED APPLICATIONS

This application is a National Stage application of PCT/JP2011/066004, filed Jul. 13, 2011, which claims priority from Japanese application JP 2010-158988, filed Jul. 13, 2010.

TECHNICAL FIELD

The present invention relates to an apparatus for producing microdroplets, and more particularly an apparatus for producing microdroplets (emulsion) having excellent monodispersity by using microchannels.

BACKGROUND ART

The present inventors have developed a method for producing an emulsion using the crossed form of microchannels as a means for producing microdroplets (emulsion) having an excellent size uniformity (monodispersity) (WO 02/068104). This technology has made it possible to produce an emulsion of a uniform size, and to flexibly control the diameter and the formation speed of emulsion droplets by manipulating the flow rate in the channel. The technology is being used in the production of a multi-phase emulsion (Kokai (Japanese Unexamined Patent Publication) No. 2004-237177), the preparation of globular solid microparticles (Kokai (Japanese Unexamined Patent Publication) No. 2004-059802 and Kokai (Japanese Unexamined Patent Publication) No. 2004-067953), the preparation of colored solid microparticles (Kokai (Japanese Unexamined Patent Publication) No. 2004-197083) and the like.

However, the above technology has problems that, with the crossed structure of only one microchannel, the upper limit of the flow rate for producing droplets is suppressed and the volume to be treated becomes smaller. In order to resolve the problems, a number of examples on the development of apparatus in which a multitude of microchannels are arranged in parallel have been reported. For example, there is a report on a microchannel board in which a total of 3 layers are stuck comprising (a) a layer of microchannels for distributing a dispersion phase, (b) a layer of microchannels for distributing a continuous phase liquid, and (c) a layer of Y-shaped microchannels for producing droplets (Kokai (Japanese Unexamined Patent Publication) No. 2004-243308).

On the other hand, the present inventors have developed an apparatus comprising: a microchannel board in which a multitude of microchannels in a crossed form for producing droplets are arranged; and a holder for retaining the microchannel board having a hierarchical structure to control the allocation of liquid to each microchannel (WO 2007/026564, Lab Chip, 2008, 8, 287-293).

However, in a microdroplet production apparatus as described above, the holder for retaining the microchannel board must be equipped with a plurality of liquid feeding paths corresponding to the plurality of inlet ports (liquid feeding ports) for feeding the dispersion phase and the continuous phase from outside the board to each of the channels of the microchannel board. This structure has problems as described below.

First, as the number of channels to be arranged in parallel in the microchannel board becomes increased, the number of liquid feeding ports of the microchannel board must be increased. Therefore, a multitude of liquid feeding paths must be provided at the corresponding positions in each hierarchical layer of the holder for retaining the microchannel board. While it is desired, from the viewpoint of effectively using the board area, that the channels be arranged more densely on the microchannel board to increase the number of channels per unit area, this requires to minimize the size of the liquid feeding ports made on the microchannel board and the hole size of the corresponding liquid feeding paths of the holder for retaining the microchannel board. Generally, a holder for retaining a microchannel board may be fabricated by machining, but the processing of a multitude of fine holes is technically difficult and leads to high cost. Also, when fine holes are densely made on the holder for retaining a microchannel board, it becomes difficult to process the feeding ports for the dispersion phase or the continuous phase from the side of each hierarchical layer by passing through the gaps of vertical holes.

Also, a holder for retaining a microchannel board cannot be used for a microchannel board having the liquid feeding ports at different positions, and thus it disadvantageously lacks versatility.

PRIOR ART DOCUMENTS

Patent Documents

Patent Document 1: WO 02/068104
Patent Document 2: Kokai (Japanese Unexamined Patent Publication) No. 2004-237177
Patent Document 3: Kokai (Japanese Unexamined Patent Publication) No. 2004-059802
Patent Document 4: Kokai (Japanese Unexamined Patent Publication) No. 2004-067953
Patent Document 5: Kokai (Japanese Unexamined Patent Publication) No. 2004-197083
Patent Document 6: Kokai (Japanese Unexamined Patent Publication) No. 2004-243308
Patent Document 7: WO 2007/026564

Non-Patent Documents

Non-patent document 1: Lab Chip, 2008, 8, 287-293

SUMMARY OF THE INVENTION

Problems to be Solved by the Invention

In view of the above circumstances, it is an object of the present invention to provide an apparatus for producing microdroplets using microchannels capable of producing microdroplets at low cost, in an efficient manner and in large quantities. It is a further object of the present invention to obtain microparticles by curing the obtained microdroplets.

Means to Solve the Problems

The present invention provides the following inventions in order to solve the above problems:

(1) An apparatus for producing microdroplets using microchannels,
said apparatus comprising a microchannel board and a holder for retaining the microchannel board, wherein
the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N−1) sequentially disposed on circular or polygonal peripheries further outside of the above peripheries, and microchannels for feeding the first to the Nth liquids to the above plurality of microdroplet-forming parts, and the holder for retaining the microchannel board has a multitube structure, with the microdroplet-outlet port as the central axis, having N circular or polygonal circular channels for allocating the even flow rate of the above first to the Nth liquids to the inlet port for each liquid of the microchannel board, wherein N=2 (simultaneously M=1), the first liquid is a dispersion phase, and the second liquid is a continuous phase, and the holder for retaining the microchannel structure has a third component which is disposed under the microchannel board and which is equipped with an inlet port for the continuous phase, a second component which is equipped with an inlet port for the dispersion phase and which forms circular or polygonal circular channels for feeding the continuous phase to the microchannel board in combination with the above third component, and a first component which forms a circular path for feeding the dispersion phase to the microchannel board in combination with the above second component and which is equipped, at the center thereof, with a cylinder having an outlet port for microdroplets from the microchannel board.

(3) The apparatus for producing microdroplets according to the above (1), wherein the plurality of microdroplet-forming parts are where the dispersion phase liquid alternately joins with the continuous phase liquid from both sides.

(5) An apparatus for producing microdroplets using microchannels, said apparatus comprising a microchannel board and a holder for retaining the microchannel board, wherein the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N−1) sequentially disposed on circular or polygonal peripheries further outside of the above peripheries, and microchannels for feeding the first to the Nth liquids to the above plurality of microdroplet-forming parts, and the holder for retaining the microchannel board has a multitube structure, with the microdroplet-outlet port as the central axis, having N circular or polygonal circular channels for allocating the even flow rate of the above first to the Nth liquids to the inlet port for each liquid of the microchannel board, wherein N=2 (simultaneously M=1), the first liquid is a continuous phase, and the second liquid is a dispersion phase, and the holder for retaining the microchannel structure has a third component which is disposed under the microchannel board and which is equipped with an inlet port for the dispersion phase, a second component which is equipped with an inlet port for the continuous phase and which forms circular or polygonal circular channels for feeding the continuous phase to the microchannel board in combination with the above third component, and a first component which is equipped with an outlet port for the formed droplets from the holder and which forms a circular or polygonal circular channel for feeding the continuous phase to the microchannel board in combination with the above second component and which is equipped, at the center thereof, with a cylinder having an outlet port for microdroplets from the microchannel board.

(6) The apparatus for producing microdroplets according to the above (5), wherein the plurality of microdroplet-forming parts are where the continuous phase joins with the above dispersion phase from both sides.

(8) An apparatus for producing microdroplets using microchannels, said apparatus comprising a microchannel board and a holder for retaining the microchannel board, wherein the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N−1) sequentially disposed on circular or polygonal peripheries further outside of the above peripheries, and microchannels for feeding the first to the Nth liquids to the above plurality of microdroplet-forming parts, and the holder for retaining the microchannel board has a multitube structure, with the microdroplet-outlet port as the central axis, having N circular or polygonal circular channels for allocating the even flow rate of the above first to the Nth liquids to the inlet port for each liquid of the microchannel board, wherein N=3, and the first liquid is a first dispersion phase, the second liquid is a second dispersion phase, and the third liquid is a continuous phase, and the formed droplets are composed of the first dispersion phase and the second dispersion phase, and the holder for retaining the microchannel structure has a fourth component which is disposed under the above microchannel board and which is equipped with an inlet port for the second dispersion phase, a third component which is equipped with an inlet port for the first dispersion phase and which forms circular or polygonal circular channels for feeding the second dispersion phase to the microchannel board in combination with the above fourth component, a second component which is equipped with an inlet port for the continuous phase and which forms circular or polygonal circular channels for feeding the first dispersion phase to the microchannel board in combination with the above third component, and a first component which is equipped with an outlet port for the formed droplets from the holder, which forms circular or polygonal circular channels for feeding the continuous phase to the microchannel board in combination with the above second component and which is equipped with a cylinder or polygonal tube having, at the center thereof, an outlet port for microdroplets from the microchannel board.

(9) An apparatus for producing microdroplets using microchannels, said apparatus comprising a microchannel board and a holder for retaining the microchannel board, wherein the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N−1) sequentially disposed on circular or polygonal peripheries further outside of the above peripheries, and microchannels for feeding the first to the Nth liquids to the above plurality of microdroplet-forming parts, and the holder for retaining the microchannel board has a multitube structure, with the microdroplet-outlet port as the central axis, having N circular or polygonal circular channels for allocating the even flow rate of the above first to the Nth liquids to the inlet port for each liquid of the microchannel board, wherein N=3, and the first liquid is a continuous phase, the second liquid is a first dispersion phase, and the third liquid is a second dispersion phase, and the formed droplets are composed of the first dispersion phase and the second dispersion phase, and the holder for retaining the microchannel structure has a fourth component which is disposed under the above microchannel board and which is equipped with an inlet port for the second dispersion phase, a third component which is equipped with an inlet port for the first dispersion phase and which forms circular or polygonal circular channels for feeding the second dispersion phase to the microchannel board in combination with the above fourth component, a second component which is equipped with an inlet port for the continuous phase and which forms circular or polygonal circular channels for feeding the first dispersion phase to the microchannel board in combination with the above third component, and a first component which is equipped with an outlet port for the formed droplets from the holder, which forms circular or polygonal circular channels for feeding the continuous phase to the microchannel board in combination with the above second component and which is equipped with a cylinder or polygonal tube having, at the center thereof, an outlet port for microdroplets from the microchannel board.

(10) The apparatus for producing microdroplets according to the above (9), wherein M=2, and the formed droplets are a double emulsion in which the first dispersion phase is the innermost phase and the second dispersion phase is an intermediate phase.

(11) The apparatus for producing microdroplets according to the above (10), wherein the plurality of the innermost phase droplet-forming parts (second microdroplet-forming parts) are where the innermost phase alternately joins with the above intermediate phase from both sides, and the plurality of the intermediate phase droplet-forming parts (first microdroplet-forming parts) are where the continuous phase joins, from both sides, with the above intermediate phase containing the innermost phase droplets.

(12) The apparatus for producing microdroplets according to the above (9), wherein M=2, and the formed droplets are a double emulsion in which the first dispersion phase is an intermediate phase and the second dispersion phase is the innermost phase.

(13) The apparatus for producing microdroplets according to the above (12), wherein the plurality of the innermost phase droplet-forming parts (second microdroplet-forming parts) are where the intermediate phase joins with the above innermost phase from both sides, and the plurality of the intermediate phase droplet-forming parts (first microdroplet-forming parts) are where the continuous phase joins, from both sides, with the intermediate phase containing the above innermost phase droplets.

(15) An apparatus for producing microdroplets using microchannels, said apparatus comprising a microchannel board and a holder for retaining the microchannel board, wherein the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N−1) sequentially disposed on circular or polygonal peripheries further outside of the above peripheries, and microchannels for feeding the first to the Nth liquids to the above plurality of microdroplet-forming parts, and the holder for retaining the microchannel board has a multitube structure, with the microdroplet-outlet port as the central axis, having N circular or polygonal circular channels for allocating the even flow rate of the above first to the Nth liquids to the inlet port for each liquid of the microchannel board, wherein N=4, and the first liquid is a continuous phase, the second liquid is a first dispersion phase, the third liquid is a second dispersion phase, the fourth liquid is a third dispersion phase, and the formed droplets are composed of three phases comprising the first dispersion phase, the second dispersion phase and the third dispersion phase, the holder for retaining the microchannel structure has a fifth component which is disposed under the above microchannel board and which is equipped with an inlet port for the third dispersion phase, a fourth component which is equipped with an inlet port for the second dispersion phase and which forms circular or polygonal circular channels for feeding the third dispersion phase to the microchannel board in combination with the above fifth component, a third component which is equipped with an inlet port for the first dispersion phase and which forms circular or polygonal circular channels for feeding the second dispersion phase to the microchannel board in combination with the above fourth component, a second component which is equipped with an inlet port for the continuous phase and which forms circular or polygonal circular channels for feeding the first dispersion phase to the microchannel board in combination with the above third component, and a first component which is equipped with an outlet port for formed droplets from the holder, which forms circular or polygonal circular channels for feeding the continuous phase to the microchannel board in combination with the above second component and which is equipped with a cylinder or polygonal tube having, at the center thereof, an outlet port for microdroplets from the microchannel board.

(16) The apparatus for producing microdroplets according to the above (15), wherein M=3, and the formed droplets are a triple emulsion in which the first dispersion phase is a first intermediate phase (a phase in contact with the continuous phase), the second dispersion phase is a second intermediate phase (a phase disposed inside of the first intermediate phase), and the third dispersion phase is the innermost phase.

(17) The apparatus for producing microdroplets according to the above (16), wherein the plurality of the innermost phase droplet-forming parts (third microdroplet-forming parts) are where the second intermediate phase joins with the innermost phase from both sides, the plurality of the first intermediate phase droplet-forming parts (second microdroplet-forming parts) are where the first intermediate phase joins, from both sides, with the first intermediate phase containing the above innermost phase droplets, and the above plurality of the second intermediate phase droplet-forming parts (first microdroplet-forming parts) are where the continuous phase joins, from both sides, with the second intermediate phase containing the first intermediate phase droplets which in turn contain the above innermost phase droplets.

(18) The apparatus for producing microdroplets according to the above (15), wherein M=3, and the formed droplets are a triple emulsion in which the first dispersion phase is a first intermediate phase, the second dispersion phase is the innermost phase, and the third dispersion phase is a second intermediate phase.

(19) The apparatus for producing microdroplets according to the above (18), wherein
the plurality of the innermost phase droplet-forming parts (third microdroplet-forming parts) are where the innermost phase joins with the second intermediate phase from both sides, and the plurality of the first intermediate phase droplet-forming parts (second microdroplet-forming parts) are where the first intermediate phase joins, from both sides, with the second intermediate phase containing the above innermost phase droplets, and
the plurality of the first intermediate phase droplet-forming parts (first microdroplet-forming parts) are where the continuous phase joins, from both sides, with the second intermediate phase containing the first intermediate phase droplets which in turn contain the above innermost phase droplets.

(22) An apparatus for producing microdroplets using microchannels,
said apparatus comprising a microchannel board and a holder for retaining the microchannel board, wherein
the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N−1) sequentially disposed on circular or polygonal peripheries further outside of the above peripheries, and microchannels for feeding the first to the Nth liquids to the above plurality of microdroplet-forming parts, and
the holder for retaining the microchannel board has a multitube structure, with the microdroplet-outlet port as the central axis, having N circular or polygonal circular channels for allocating the even flow rate of the above first to the Nth liquids to the inlet port for each liquid of the microchannel board, wherein
N=5, and the first liquid is a continuous phase, the second liquid is a first dispersion phase, the third liquid is a second dispersion phase, the fourth liquid is a third dispersion phase, the fifth liquid is a fourth dispersion phase, and the formed droplets are composed of four phases comprising the first dispersion phase, the second dispersion phase, the third dispersion phase and the fourth dispersion phase,
the holder for retaining the microchannel structure has
a sixth component which is disposed under the above microchannel board and which is equipped with an inlet port for the fourth dispersion phase,
a fifth component which is equipped with an inlet port for the third dispersion phase and which forms circular or polygonal circular channels for feeding the fourth dispersion phase to the microchannel board in combination with the above sixth component,
a fourth component which is equipped with an inlet port for the second dispersion phase and which forms circular or polygonal circular channels for feeding the third dispersion phase to the microchannel board in combination with the above fifth component,
a third component which is equipped with an inlet port for the first dispersion phase and which forms circular or polygonal circular channels for feeding the second dispersion phase to the microchannel board in combination with the above fourth component,
a second component which is equipped with an inlet port for the continuous phase and which forms circular or polygonal circular channels for feeding the first dispersion phase to the microchannel board in combination with the above third component, and
a first component which is equipped with an outlet port for formed droplets from the holder, which forms circular or polygonal circular channels for feeding the continuous phase to the microchannel board in combination with the above second component and which is equipped with a cylinder or polygonal tube having, at the center thereof, an outlet port for microdroplets from the microchannel board.

(23) The apparatus for producing microdroplets according to the above (22), wherein M=4, and the formed droplets are a quadruple emulsion in which the first dispersion phase is a first intermediate phase (a phase in contact with the continuous phase), the second dispersion phase is a second intermediate phase (a phase disposed inside of the first intermediate phase), the third dispersion phase is a third intermediate phase (a phase disposed inside of the second intermediate phase), and the fourth dispersion phase is the innermost phase.

(24) The apparatus for producing microdroplets according to the above (23), wherein the plurality of the innermost phase droplet-forming parts (fourth microdroplet-forming parts) are where the third intermediate phase joins with the innermost phase from both sides, the plurality of the third intermediate phase droplet-forming parts (third microdroplet-forming parts) are where the second intermediate phase joins with the third intermediate phase from both sides, the plurality of the second intermediate phase droplet-forming parts (second microdroplet-forming parts) are where the first intermediate phase joins, from both sides, with the second intermediate phase containing the third intermediate phase droplets which in turn contain the above innermost phase droplets, and the above plurality of the first intermediate phase droplet-forming parts (first microdroplet-forming parts) are where the continuous phase joins, from both sides, with the first intermediate phase containing the second intermediate phase droplets containing the third intermediate phase droplets which in turn contain the above innermost phase droplets.

(25) The apparatus for producing microdroplets according to the above (22), wherein M=4, and the formed droplets are a quadruple emulsion in which the first dispersion phase is a first intermediate phase (a phase in contact with the continuous phase), the second dispersion phase is a second intermediate phase (a phase disposed inside of the first intermediate phase), the third dispersion phase is the innermost phase, and the fourth dispersion phase is a third intermediate phase (a phase disposed inside of the second intermediate phase).

(26) The apparatus for producing microdroplets according to the above (25), wherein
the plurality of the innermost phase droplet-forming parts (fourth microdroplet-forming parts) are where the innermost phase joins with the third intermediate phase from both sides, the plurality of the third intermediate phase droplet-forming parts (third microdroplet-forming parts) are where the second intermediate phase joins, from both sides, with the third intermediate phase containing the above innermost phase droplets, the plurality of the above second intermediate phase droplet-forming parts (second microdroplet-forming parts) are where the first intermediate phase joins, from both sides, with the second intermediate phase containing the third intermediate phase droplets which in turn contain the above innermost phase droplets, and the plurality of the above first intermediate phase droplet-forming parts (first microdroplet-forming parts) are where the continuous phase joins, from both sides, with the first intermediate phase containing the second intermediate phase droplets containing the third intermediate phase droplets which in turn contain the above innermost phase droplets.

Effects of the Invention

In accordance with the present invention, holes in a chip and spacing between channels can be freely designed without requiring any micropore processing, and thus an apparatus for producing microdroplets and microparticles obtained therefrom using microchannels capable of producing microdroplets at low cost, in an efficient manner and in large quantities can be provided.

BRIEF EXPLANATION OF THE DRAWINGS

FIG. 5(*b*) shows a procedure for mounting a microchannel structure (chip) to a holder for retaining the microchannel structure according to the present invention.

FIG. 5(*c*) shows a state immediately before mounting a positioning component, a microchannel structure (chip) and a windowed cover according to the above (b).

FIG. 11 is a top plan view (a) and a side view (b) of the microchannel structure (chip) of an apparatus for producing microdroplets illustrating another example of the present invention.

DESCRIPTION OF EMBODIMENTS

According to the first embodiment of the present invention, an apparatus for producing microdroplets comprises a microchannel board and a holder for retaining the microchannel board, and the microchannel board has a microdroplet-outlet port formed at the center thereof, microdroplet-forming parts on a first to a Mth (M is an integer of 1 or more) circular or polygonal peripheries from inside to outside, said parts being connected through the microchannels to the microdroplet-outlet port and a plurality of said parts being disposed on each of M circular or polygonal peripheries with the microdroplet-outlet port at the center, inlet ports for a first liquid disposed on circular or polygonal peripheries with the microdroplet-outlet port at the center, inlet ports for liquids up to a Nth liquid (N is an integer of 2 or more, M≤N-1) sequentially disposed on circular or polygonal peripheries further outside of the above peripheries, and microchannels for feeding the first to the Nth liquids to the above plurality of microdroplet-forming parts.

On the other hand, a holder for retaining the microchannel board has a multitube structure, with the microdroplet-outlet port as the central axis, having N circular or polygonal, circular channels for allocating the even flow rate of the above first to the Nth liquids to the inlet port for each liquid of the microchannel board. The integer N may preferably be 2 to 5.

Figure 1:
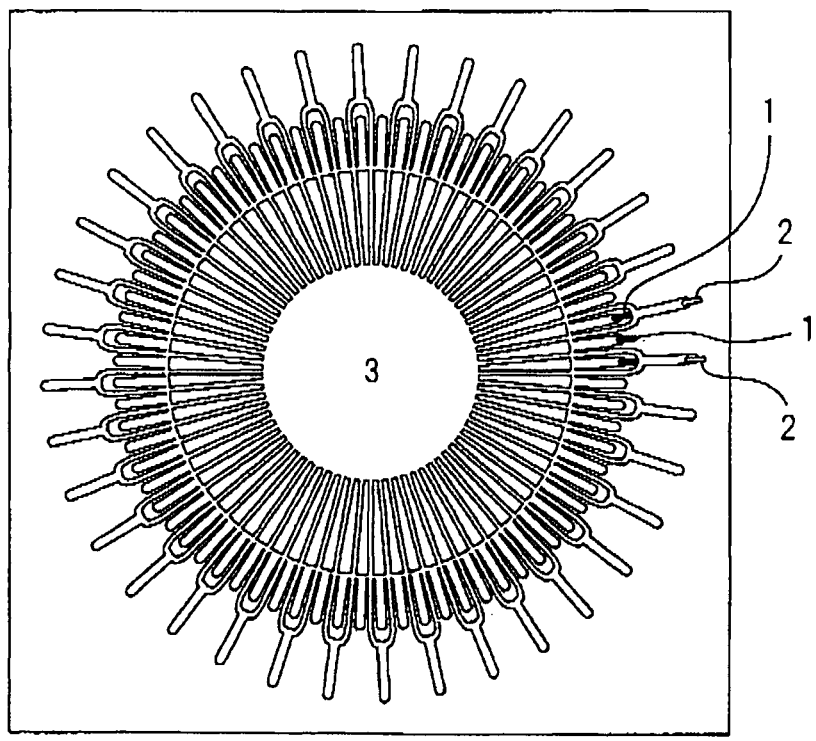
FIG. 1 is a top plan view showing a microchannel structure (chip) of an apparatus for producing microdroplets illustrating one example of the present invention.
Figure 2:
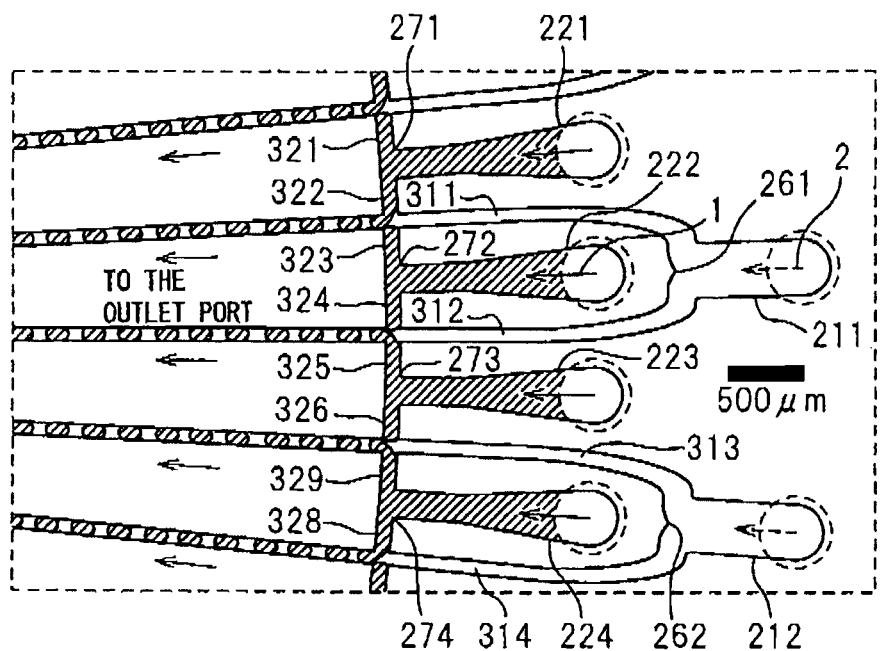
FIG. 2 is a schematic partially enlarged view illustrating one example of microdroplet formation in microchannels.

According to the second embodiment of the present invention, in the apparatus for producing microdroplets of the above first embodiment, N=2 (simultaneously M=1), and the first liquid is a dispersion phase and the second liquid is a continuous phase. FIG. 1 is a top plan view showing an example of the microchannel structure (chip) of the apparatus for producing microdroplets of the above second embodiment of the present invention (1 represents a dispersion phase, 2 represents a continuous phase, and 3 represents an outlet port). FIG. 2 is a schematic partially enlarged view illustrating one example of microdroplet in microchannels, wherein 1 represents a dispersion phase, 2 represents a continuous phase, and after the continuous phase liquid and the dispersion phase liquid joined with each other, microdroplets are being formed at the microdroplet-forming part. In FIG. 2, 211 and 212 represent outlet ports for the continuous phase liquid, 261 and 262 represent branching parts for the continuous phase liquid discharged from the outlet ports 211 and 212, and 311 to 314 represent microchannels for the branched continuous phase liquid that is branched at the branching parts 261 and 262. 221 to 224 represent outlet ports for the dispersion phase liquid, 271 to 274 represent branching parts for the dispersion phase liquid discharged from the outlet ports 221 to 224, and, at the branching parts 271 to 274 for the dispersion phase liquid, microchannels 321 to 328 for the dispersion phase liquid to be branched are branched and formed.

Figure 3:
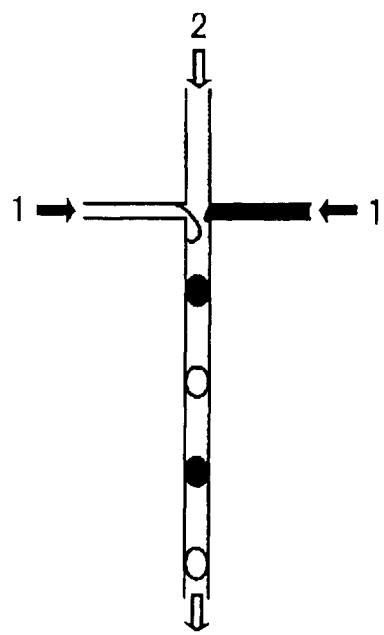
FIG. 3 a schematic view of microdroplet formation at a cruciform channel of the apparatus for producing microdroplets according to the present invention.

Furthermore, according to the third embodiment of the present invention, in the apparatus for producing microdroplets of the above second embodiment, the plurality of microdroplet-forming parts are where the dispersion phase liquid alternately joins with the continuous phase liquid from both sides. FIG. 3 shows a schematic view of microdroplet formation at a cruciform channel of the apparatus for producing microdroplets according to the third embodiment of the present invention, in which 1 represents the dispersion phase and 2 represents the continuous phase.

Figure 4:
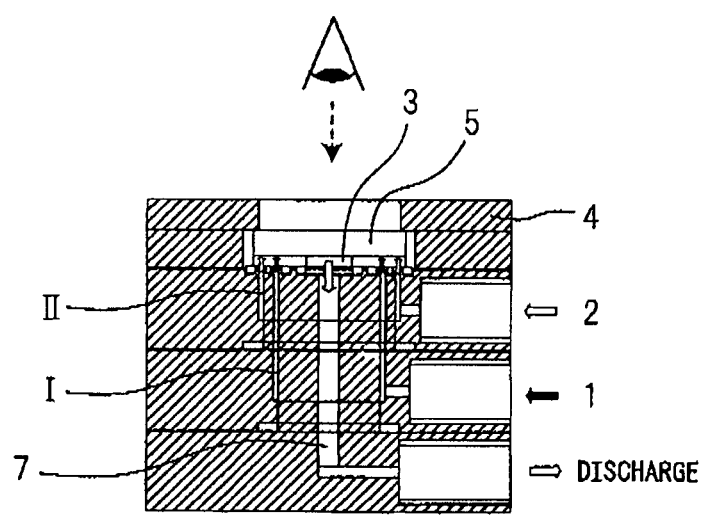
FIG. 4 is a sectional view of a holder for retaining the microchannel structure of the apparatus for producing microdroplets according to the present invention.

Furthermore, according to the fourth embodiment of the present invention, in the apparatus for producing microdroplets of the above second embodiment, the holder for retaining the microchannel structure has a third component which is disposed under the microchannel board and which is equipped with an inlet port for the continuous phase, a second component which is equipped with an inlet port for the dispersion phase and which forms circular or polygonal circular channels for feeding the continuous phase to the microchannel board in combination with the above third component, and a first component which forms a circular path for feeding the dispersion phase to the microchannel board in combination with the above second component and which is equipped, at the center thereof, with a cylinder having an outlet port for microdroplets from the microchannel board. FIG. 4 is a sectional view of a holder for retaining the microchannel structure of the apparatus for producing microdroplets according to the present invention, and FIG. 5($a$) to FIG. 5($c$) are exploded views of a holder for retaining the microchannel structure according to the present invention.

According to the fifth embodiment of the present invention, in the apparatus for producing microdroplets of the above first embodiment, N=2 (simultaneously M=1), and the first liquid is a continuous phase and the second liquid is a dispersion phase. This is an embodiment in which the dispersion phase and the continuous phase in FIG. 1 are switched with each other.

According to the sixth embodiment of the present invention, in the apparatus for producing microdroplets of the above first embodiment, the plurality of microdroplet-forming parts are where the dispersion phase liquid joins with the continuous phase from both sides. This is an embodiment in which the dispersion phase and the continuous phase in FIG. 3 are switched with each other.

According to the seventh embodiment of the present invention, in the apparatus for producing microdroplets of the above fifth embodiment, the holder for retaining the microchannel structure has a third component which is disposed under the above microchannel board and which is equipped with an inlet port for the dispersion phase, a second component which is equipped with an inlet port for the continuous phase and which forms circular or polygonal circular channels for feeding the dispersion phase to the microchannel board in combination with the above third component, and a first component which is equipped with an outlet port for the formed droplets from the holder, which forms circular or polygonal circular channels for feeding the continuous phase to the microchannel board in combination with the above second component and which is equipped with a cylinder having, at the center thereof, an outlet port for microdroplets from the microchannel board. This is an embodiment in which the dispersion phase and the continuous phase in FIG. 4 and FIG. 5($a$) to 5($c$) are switched with each other.

According to an eighth embodiment of the present invention, in the apparatus for producing microdroplets of the above first embodiment, N=3, the first liquid is a continuous phase, the second liquid is a first dispersion phase, and the third liquid is a second dispersion phase, and the formed droplets are composed of the first dispersion phase and the second dispersion phase.

Figure 6:
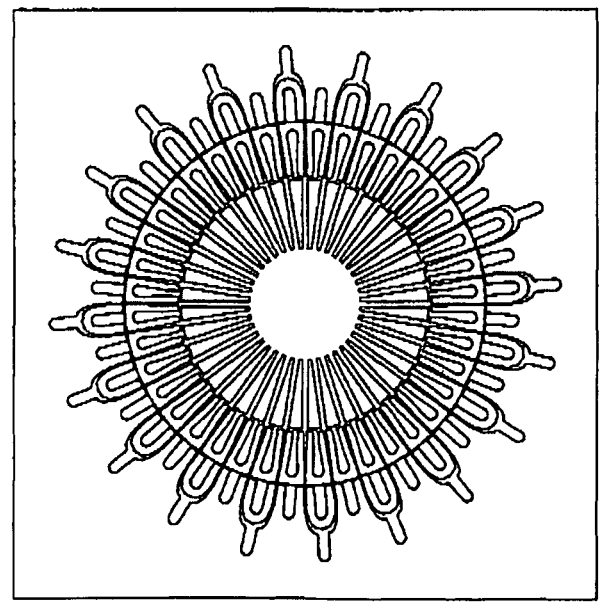
FIG. 6 is a top plan view of a microchannel structure (chip) of an apparatus for producing microdroplets illustrating one example of the present invention.

According to the ninth embodiment of the present invention, in the apparatus for producing microdroplets of the above eighth embodiment, M=2, and the formed droplets are a double emulsion in which the first dispersion phase is the innermost phase and the second dispersion phase is an intermediate phase. FIG. 6 is a top plan view of the microchannel structure (chip) of the apparatus for producing microdroplets illustrating an example of the ninth embodiment of the present invention.

Figure 7:
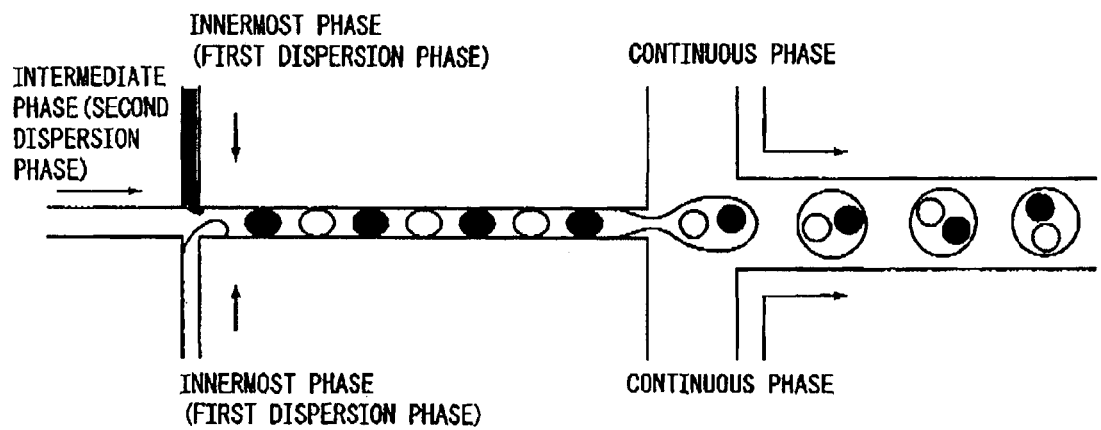
FIG. 7 is a schematic view of one example of microdroplet formation of the present invention.

According to the 10th embodiment of the present invention, in the apparatus for producing microdroplets of the above ninth embodiment, the plurality of the innermost phase droplet-forming parts (second microdroplet-forming parts) are where the innermost phase alternately joins with the above intermediate phase from both sides, and the plurality of the intermediate phase droplet-forming parts (first microdroplet-forming parts) are where the continuous phase joins, from both sides, with the above intermediate phase containing the innermost phase droplets. FIG. 7 illustrates a schematic diagram of microdroplet formation according to this embodiment.

According to an 11th embodiment of the present invention, in the apparatus for producing microdroplets of the above ninth embodiment, M=2, and the formed droplets are a double emulsion in which the first dispersion phase is an intermediate phase and the second dispersion phase is the innermost phase. This corresponds to a case where the positions of the first dispersion phase and the second dispersion phase are switched with each other in FIG. 6.

According to the 12th embodiment of the present invention, in the apparatus for producing microdroplets of the above 11th embodiment, the plurality of the innermost phase droplet-forming parts (second microdroplet-forming parts) are where the intermediate phase joins with the above innermost phase from both sides, and the plurality of the intermediate phase droplet-forming parts (first microdroplet-forming parts) are where the continuous phase joins, from both sides, with the intermediate phase containing the above innermost phase droplets.

According to the 13th embodiment of the present invention, in the apparatus for producing microdroplets of the above eighth to 12th embodiments, the holder for retaining the microchannel structure has a fourth component which is disposed under the above microchannel board and which is equipped with an inlet port for the second dispersion phase, a third component which is equipped with an inlet port for the first dispersion phase and which forms circular or polygonal circular channels for feeding the second dispersion phase to the microchannel board in combination with the above fourth component, a second component which is equipped with an inlet port for the continuous phase and which forms circular or polygonal circular channels for feeding the first dispersion phase to the microchannel board in combination with the above third component, and a first component which is equipped with an outlet port for the formed droplets from the holder, which forms circular or polygonal circular channels for feeding the continuous phase to the microchannel board in combination with the above second component and which is equipped with a cylinder or polygonal tube having, at the center thereof, an outlet port for microdroplets from the microchannel board.

According to the 14th embodiment of the present invention, in the apparatus for producing microdroplets according to the above first embodiment, N=4, the first liquid is a continuous phase, the second liquid is a first dispersion phase, the third liquid is a second dispersion phase, and the fourth liquid is a third dispersion phase, and the formed droplets are composed of three phases comprising the first dispersion phase, the second dispersion phase and the third dispersion phase.

Figure 8:
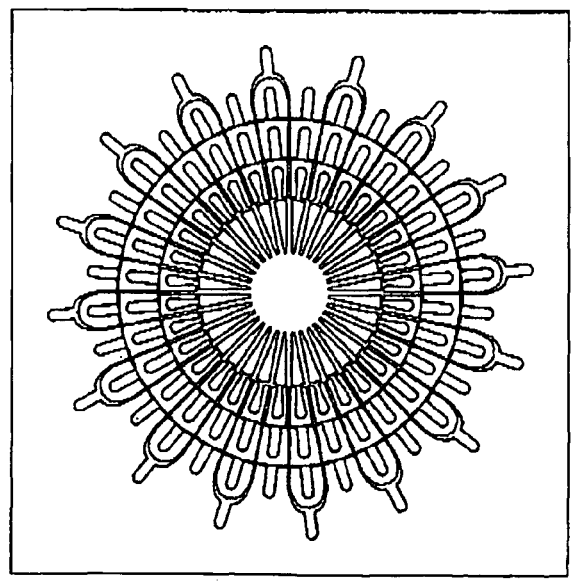
FIG. 8 is a top plan view of a microchannel structure (chip) of an apparatus for producing microdroplets illustrating one example of the present invention.

According to the 15th embodiment of the present invention, in the apparatus for producing microdroplets according to the above 14th embodiment, M=3, and the formed droplets are a triple emulsion in which the first dispersion phase is a first intermediate phase (a phase in contact with the continuous phase), the second dispersion phase is a second intermediate phase (a phase disposed inside of the first intermediate phase), and the third dispersion phase is the innermost phase. FIG. 8 is a top plan view of a microchannel structure (chip) of an apparatus for producing microdroplets illustrating an example of the 15th embodiment of the present invention.

According to the 16th embodiment of the present invention, in the apparatus for producing microdroplets according to the above 15th embodiment, the plurality of the innermost phase droplet-forming parts (third microdroplet-forming parts) are where the second intermediate phase joins with the innermost phase from both sides, the plurality of the second intermediate phase droplet-forming parts (second microdroplet-forming parts) are where the first intermediate phase joins, from both sides, with the second intermediate phase containing the above innermost phase droplets, and the above plurality of the first intermediate phase droplet-forming parts (first microdroplet-forming parts) are where the continuous phase joins, from both sides, with the first intermediate phase containing the second intermediate phase droplets which in turn contain the above innermost phase droplets.

According to the 17th embodiment of the present invention, in the apparatus for producing microdroplets according to the above 14th embodiment, M=3, and the formed droplets are a triple emulsion in which the first dispersion phase is a first intermediate phase, the second dispersion phase is the innermost phase, and the third dispersion phase is a second intermediate phase. FIG. 8 is a top plan view of a microchannel structure (chip) of an apparatus for producing microdroplets illustrating an example of the 17th embodiment of the present invention.

According to the 18th embodiment of the present invention, in the apparatus for producing microdroplets according to the above 17th embodiment, the plurality of the innermost phase droplet-forming parts (third microdroplet-forming parts) are where the innermost phase joins with the second intermediate phase from both sides, and the plurality of the second intermediate phase droplet-forming parts (second microdroplet-forming parts) are where the first intermediate phase joins, from both sides, with the second intermediate phase containing the above innermost phase droplets, and the plurality of the first intermediate phase droplet-forming parts (first microdroplet-forming parts) are where the continuous phase joins, from both sides, with the first intermediate phase containing the second intermediate phase droplets which in turn contain the above innermost phase droplets.

According to the 19th embodiment of the present invention, in the apparatus for producing microdroplets according to the above 14th to 18th embodiments, the holder for retaining the microchannel structure has a fifth component which is disposed under the above microchannel, board and which is equipped with an inlet port for the third dispersion phase, a fourth component which is equipped with an inlet port for the second dispersion phase and which forms circular or polygonal circular channels for feeding the third dispersion phase to the microchannel board in combination with the above fifth component, a third component which is equipped with an inlet port for the first dispersion phase and which forms circular or polygonal circular channels for feeding the second dispersion phase to the microchannel board in combination with the above fourth component, a second component which is equipped with an inlet port for the continuous phase and which forms circular or polygonal circular channels for feeding the first dispersion phase to the microchannel board in combination with the above third component, and a first component which is equipped with an outlet port for formed droplets from the holder, which forms circular or polygonal circular channels for feeding the continuous phase to the microchannel board in combination with the above second component and which is equipped with a cylinder or polygonal tube having, at the center thereof, an outlet port for microdroplets from the microchannel board.

According to the 20th embodiment of the present invention, an apparatus for producing microdroplets using microchannels has a microchannel board and a holder for retaining the microchannel board, the microchannel board has a plurality of microdroplet-outlet ports formed in a line, a plurality of microdroplet-forming parts which are connected through the microchannels to the microdroplet-outlet ports and a plurality of which are disposed in a line in parallel to the microdroplet-outlet ports, a plurality of inlet ports for the first liquid which are disposed in a line in parallel to the above microdroplet-outlet ports, a plurality of inlet ports for the second liquid similarly disposed further outside thereof, and microchannels for feeding the above first and the second liquids to the above plurality of microdroplet-forming parts. On the other hand, the holder for retaining the microchannel board forms slit parts corresponding to the line of the microdroplet-outlet ports and to the line of the inlet ports for the above first and the second liquids, and a discharge layer having the microdroplet-outlet ports and the first and the second liquid-inlet layers each having inlet ports for the first and the second liquids have a hierarchical structure for allocating the even flow rate of the above first and the second liquids to the inlet ports for each liquid of the microchannel board. In this embodiment, though the microchannel board and the holder for retaining the microchannel board has a matrix arrangement in stead of a circular arrangement, they have advantages similar to those of the circular arrangement. Thus, the holder for retaining the microchannel board need not be equipped with a plurality of liquid-feeding channels corresponding to the plurality of inlet ports (liquid-feeding ports) for feeding the dispersion phase and the continuous phase from outside the board to each channel of the microchannel board. The above slit parts are correspondingly provided so as to be connected to the above outlet ports and the liquid-inlet ports described below. While FIG. 13 described below illustrates an example of such slit parts (each slit is independent), two slit parts 10 and 11, for example, can be joined at the ends thereof in a U-shape.

The microchannel structure (chip) of the apparatus for producing microdroplets of the present invention will be explained in further detail with reference to the above FIG. 1. In the microchannel chip, with the microdroplet-outlet port 3 at the center, 36 inlet ports fox the continuous phase liquid at the outermost position and 72 inlet ports for the dispersion phase liquid inside thereof are each disposed in a concentric arrangement with the microdroplet-outlet port at the center, and a microdroplet-forming part comprising branching channels for the continuous phase liquid and the dispersion phase liquid and cruciform channels at 72 positions (thus, 144 T-shaped paths) where microdroplets are formed is formed at the innermost part thereby to form a microchannel structure. Thus, from the periphery, the continuous phase liquid and the dispersion phase liquid intersect each other in a cruciform to form microdroplets at 72 cross roads (144 T-shaped paths), and the formed microdroplets are guided to the microdroplet-outlet ports at the center and discharged.

Figure 5B:
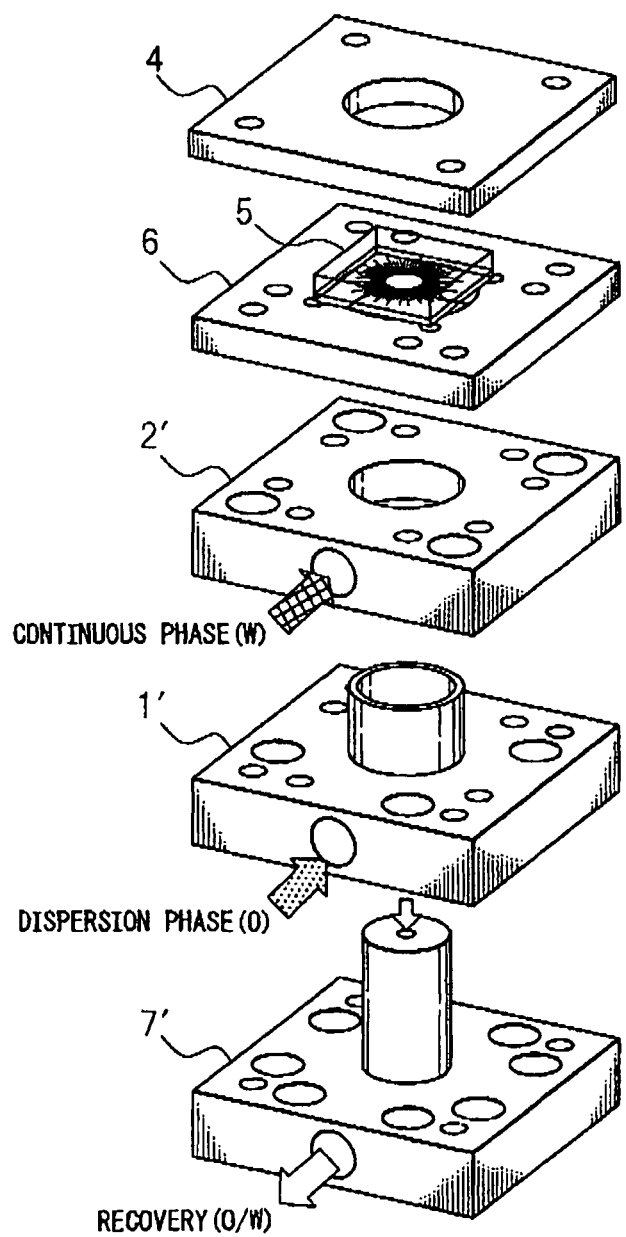
FIG. 5(*a*) is an exploded (sectional) view of a holder for retaining a microchannel structure according to the present invention.
Figure 5C:
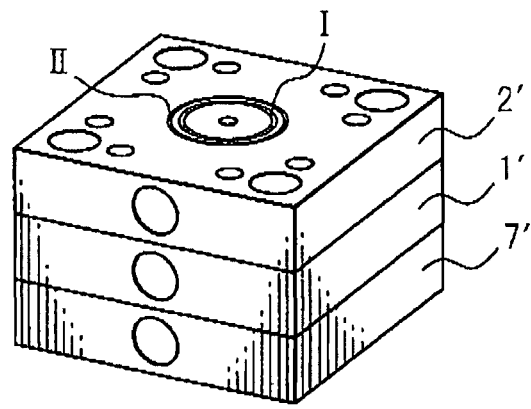

Next, the multitube structure of a holder for retaining the microchannel structure of the microdroplet production apparatus illustrating one example of the present invention will be explained in further detail with reference to the above FIG. 4 and FIG. 5(*a*) to FIG. 5(*c*). As used herein, a multitube structure which is disposed so that, under a positioning component 6 for a windowed cover 4 and a microchannel board 5, a first component 7' which is a discharge layer having an outlet port 7 can be provided with a microdroplet-outlet port 3 located at the center of the microchannel board as a central axis, and, at outside thereof across the cylindrical wall of the discharge layer 7', a second component 1' which is a dispersion phase 1 (first liquid)-inlet layer having circular channels for feeding the dispersion phase can be provided, and, at further outside thereof across the cylindrical wall, a third component 2' which is a continuous phase 2 (second liquid)-inlet layer having circular channels for feeding the continuous phase can be provided is provided in a form that a plurality of cylindrical components may become interlocked with each other. In a form in which the components have been combined in a procedure shown in FIG. 5(*b*) (FIG. 4, and FIG. 5(*c*) showing a state immediately before mounting a positioning component 6, a microchannel structure (chip) 5 and a windowed cover 4), the inner wall of a cylinder located at the center of a component for feeding the liquid of the dispersion phase 1 and the liquid of the continuous phase 2 and the outer wall of the cylinder located inside of the cylinder and extended from a lower layer component are so designed that circular gaps may be produced between the two, and, as shown in FIG. 4 and FIG. 5(*c*), the dispersion phase liquid and the continuous phase liquid can flow through a dispersion phase channel 1 and a continuous phase channel 11 formed at the above gaps. The dispersion phase channel 1, a circular channel through which the dispersion phase liquid flows, and the continuous phase channel 11, a circular channel through which the continuous phase liquid flows, have been so designed that they reach the microchannel board and they can be connected with the inlet port for the dispersion phase liquid or the continuous phase liquid, said inlet port being provided in different concentric forms on the microchannel board.

Such a multitube structure enables to evenly allocate the flow rate to each of the inlet ports for the dispersion phase liquid and the inlet ports for the continuous phase liquid on the microchannel board without creating a multitude of microholes in the holder for retaining the microchannel structure. Using this, a microdroplet production apparatus can be provided more easily and at lower cost. Also, the liquid inlet ports on the microchannel board may only be needed to be disposed so as to fit with the positions of the circular channels of the holder for retaining the microchannel board, and the number of the liquid inlet ports on the microchannel board is not specifically limited. Thus, if the position of the circle in which the liquid inlet port is arranged and the position of the circular channel of the holder fit with each other, one holder can be used for a variety of microchannel boards having different channel shapes and a different number of liquid inlet ports, and thus significant enhancement in versatility can be expected.

Figure 12:
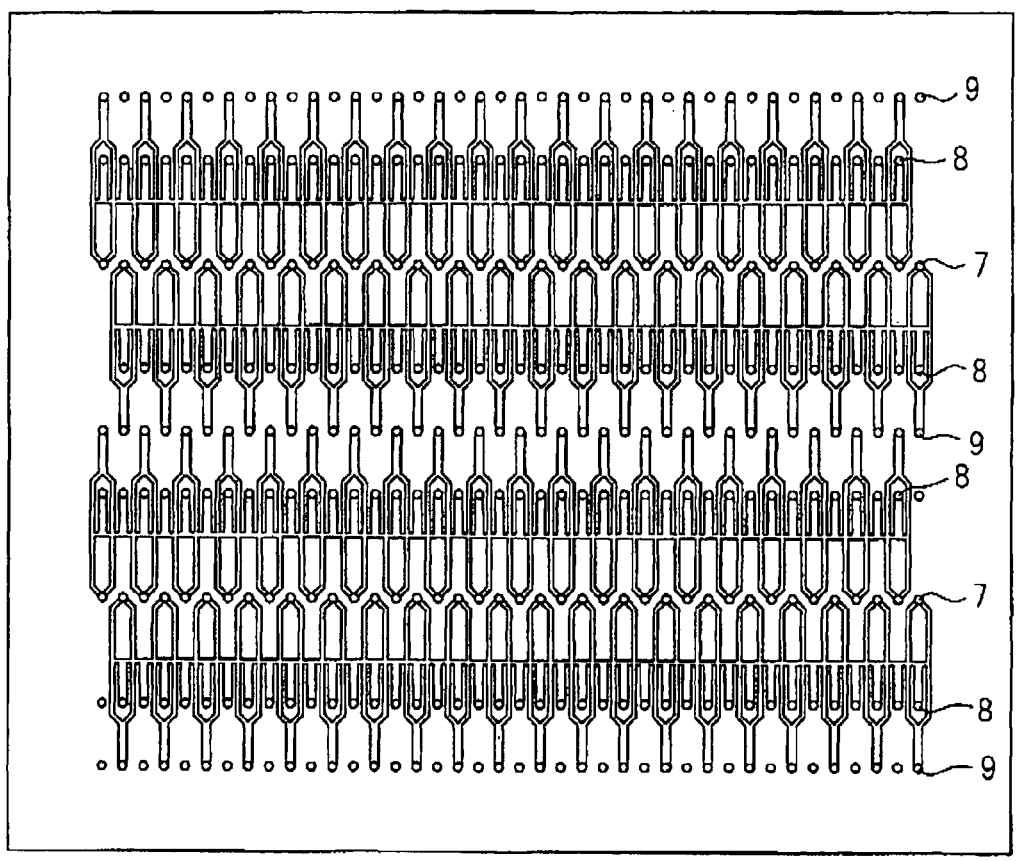
FIG. 12 is a top plan view showing an example of the microchannel structure of an apparatus for producing microdroplets of FIG. 11.
Figure 13:
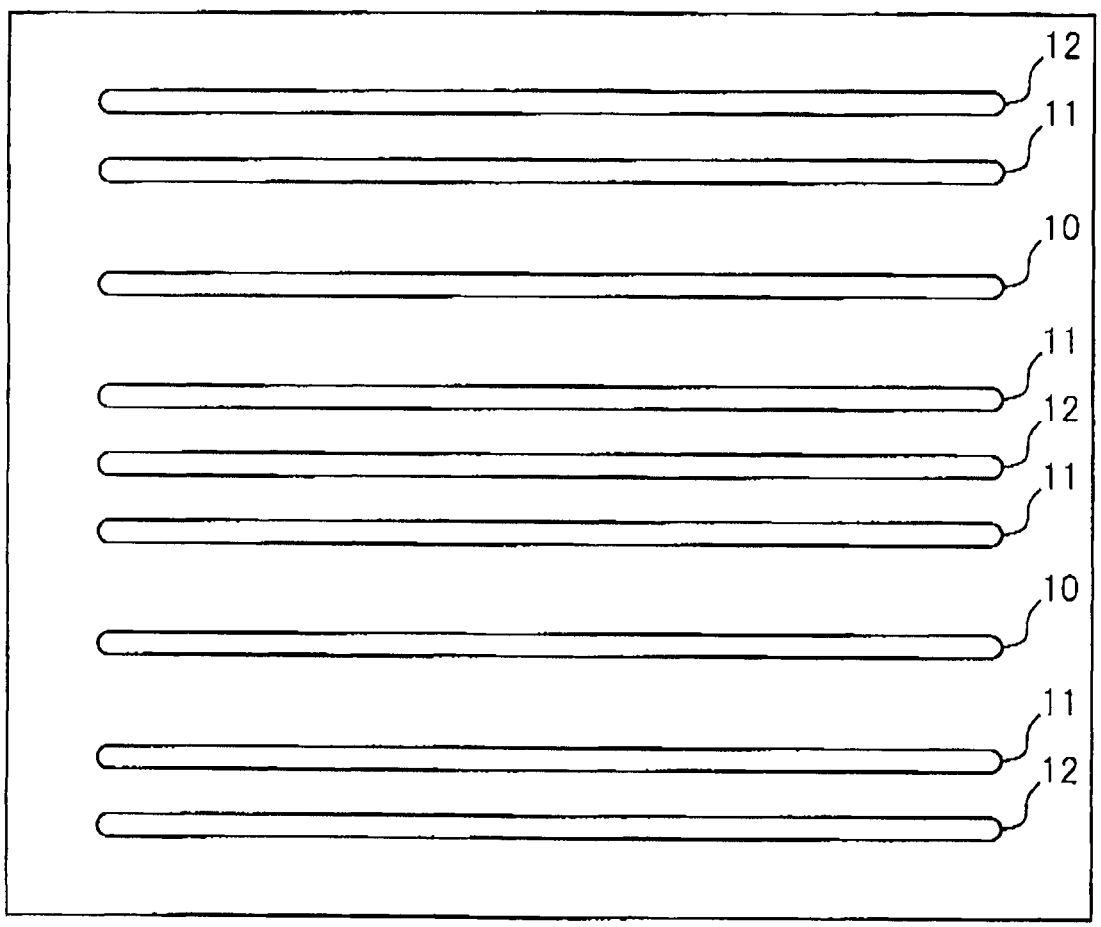
FIG. 13 is a top plan view showing one example of a holder for retaining the microchannel structure of an apparatus for producing microdroplets of FIG. 12.

Then, a 20th embodiment of the present invention will be explained in further detail with reference to FIGS. 11 to 13. FIG. 11 is a top plan view (a) and a side view (b) showing this microchannel structure (chip) and a holder for retaining the microchannel structure, and FIG. 12 is a top plan view showing an example of the microchannel structure (chip), and FIG. 13 is a top plan view showing an example of the holder for retaining the microchannel structure.

As shown in FIG. 11(*b*), under a component 6 for positioning a windowed cover 4 and a microchannel board 5, with the microdroplet-outlet port located at the center of the microchannel board as a central axis, there are disposed a discharge layer 7' having an outlet port 7, an inlet layer 1' for the dispersion phase (first liquid) 1 on the discharge layer 7', and thereon, an inlet layer 2' for the continuous phase (second liquid) 2. In FIG. 11(*b*), 8 and 9 refer to an inlet port for the first liquid and the second liquid, respectively. As shown in FIG. 11(*a*) and FIG. 13, the holder for retaining the microchannel board forms slit parts corresponding to the line of the microdroplet-outlet ports 7 and to the line of the inlet ports B and 9 for the above first and the second liquids in FIG. 11(*b*) and FIG. 12, and, as described above, a discharge layer 7' having the microdroplet-outlet ports as well as the first and the second liquid-inlet layers 1' and 2' having each inlet port for the first and the second liquids have a hierarchical structure for allocating the even flow rate of the above first and the second liquids to the inlet ports for respective liquids of the microchannel board. In FIG. 13, 10 to 12 represent slit parts corresponding to the outlet port 7, to the first liquid-inlet port 8, and to the second liquid-inlet port 9 and the outlet port 7, respectively.

According to the present invention, the branched structure of the microchannel may preferably be selected from, but not limited to, a crossroad, a T-junction or a Y-junction. The size of the microchannel can be determined depending on the purpose, and may usually be selected from about 0.1-1000 μm, preferably about 10-500 μm. The material constituting the microchannel may be any of plastic, ceramic, metal etc., and when the wall of the microchannel is to be made hydrophobic, an acrylic resin, a silicone resin etc. may be preferred. On the other hand, when it is to be made hydrophilic, quartz glass, silicon, borosilicate glass (for example, "Pyrex" (registered trademark)) etc. may be preferred. The shape and size of the material constituting the microchannel can be selected as appropriate depending on the intended use etc., and for example a plate form (for example, about several centimeter square) having processed channels may be mentioned.

According to the method of the present invention, the liquid constituting the continuous phase may be an organic compound or water, whereas the liquid constituting the dispersion phase may be a curable liquid. As organic compounds, there can preferably be mentioned, but not limited to, alkanes such as decane and octane, halogenated hydrocarbons such as chloroform, aromatic hydrocarbons such as toluene, fatty acids such as oleic acid, and the like.

As curable liquids, any liquid that can be cured with heat, light or the like may be used without limitation. For example, a known polymerizable monomer, oligomer or polymer may be mentioned, and preferably an acrylic monomer, styrenic monomer etc. may be mentioned. When a plurality of dispersion phases such as the first dispersion phase and the second dispersion phase are used, different colorants may be included in them as described below, and a curable liquid that constitutes these dispersion phases may be the same or different.

The combination of the dispersion phase and the continuous phase may usually be the O/W, O/O, or W/O type. In the channel, the dispersion phase joins with the continuous phase in laminar flow, and are sequentially deformed to spherical microdroplets, which are simultaneously or with a time difference cured, thereby forming microparticles.

The flow rate of the dispersion phase and the continuous phase may depend on the type and may usually be selected from about 1≤μm to 1000 ml/hr.

The dispersion phase of the present invention may be separated into two different colors as the first dispersion phase and the second dispersion phase, or a different colorant may be added to one or both of them, and an additive for electrification or magnetization may be used as needed. As the colorant, two split phase colors selected from achromatic colors such as white and black or chromatic colors such as red, blue, green, purple, and yellow. As dyes and pigments that can form such colors, various lipophilic dyes or various inorganic and organic pigments may be used without limitation. These dyes and pigments may be selected and used depending on the dispersibility into a curable component, the desired color hue to be used in two-color microparticles obtained, and the like. The colorant may be used only in one of the dispersion phases.

The amount added of a dye or a pigment as the colorant may usually be, but not limited to, in the range of about 0.1-10 parts by weight per 100 parts by weight of the curable component.

According to the present invention, two color-split components may be turned into charged components having either a positive or a negative charge different to each other using a charge imparting agent. Alternatively, as polymerizable monomers, monomer species that tend to exhibit a (−) charge and a (+) charge, respectively, may be mentioned as an electric charge according to the present invention described above, depending on the type of its functional group or substituent group. For example, as polymerizable monomers that tend to exhibit a (−) charge, there can be mentioned acrylic aryl esters such as phenyl(meth)acrylirate, epoxy group-containing polymerizable compounds such as glycidyl(meth)acrylirate, hydroxy group-containing polymerizable compounds such as (meth)acrylirate-2-hydroxy ethyl, styrenic monomers such as methyl styrene, and the like. On the other hand, as polymerizable monomers that tend to exhibit a (+) charge, there can be mentioned amide group-containing vinyl monomers such as methacrylamide.

According to the present invention, by dispersing magnetic powders, microdroplets that are phase split into two colors can be magnetized either positively or negatively, differently to each other.

Microdroplets obtained by the method of the present invention can be cured by heat, light such as ultraviolet ray, and the like to obtain microparticles.

As used herein, when polymerization-curing is carried out under ultraviolet irradiation, a photopolymerization initiator such as acetophenone can be used, and when polymerization-curing is carried out under heating, a thermally-degradable photopolymerization initiator such as an organic peroxide can also be used.

EXAMPLES

The present invention will now be explained with reference to specific examples, but the present invention is not limited to these examples in any way.

Specific Example 1

Figure 9:
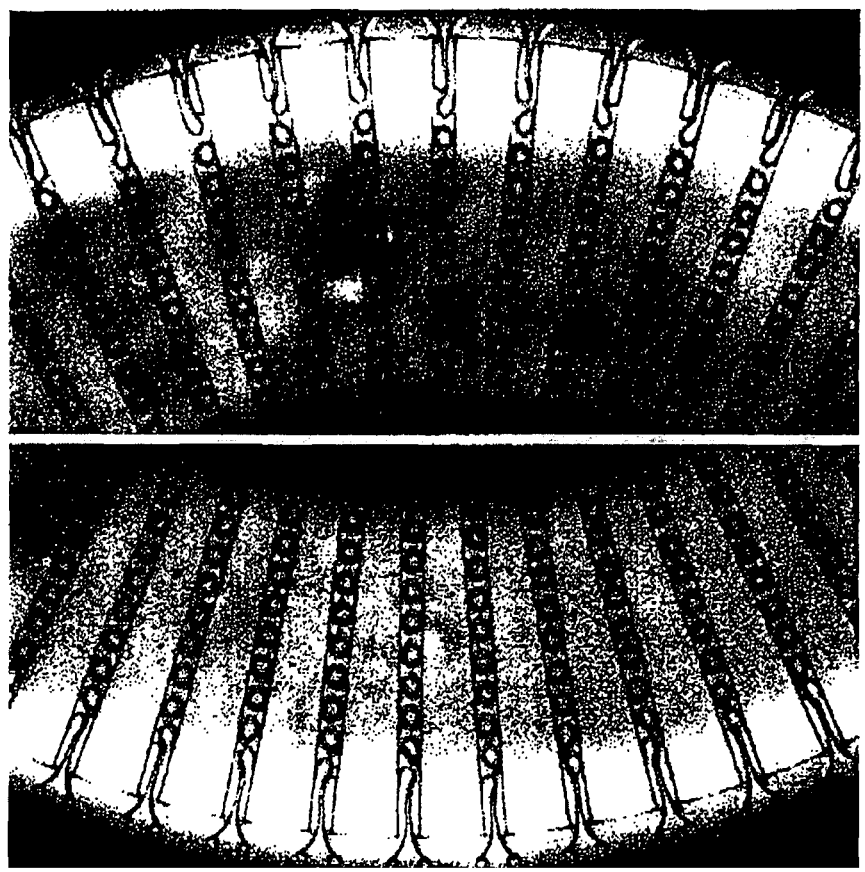
FIG. 9 is a diagram showing how microdroplets are formed.

A microchannel chip as shown in FIG. 1 was fabricated by processing on a glass board (synthetic quartz). By dry etching of the board, micro grooves (100 μm wide, 100 μm deep throughout the total area) having a rectangular cross section were made on the board, and cut into a size of 15 mm×15 mm. It was stuck by thermal adhesion to another board having the same area that had been perforated for a liquid-inlet port (0.25 mm in diameter, 108 positions) and outlet port (4.5 mm in diameter, one position) to prepare a microchannel chip. As shown in FIG. 4, this was mounted on a stainless steel (SUS304) holder prepared by machining and used. As the dispersion phase, 1,6-hexanediol diacrylate (Shin-Nakamura Chemical Co., Ltd) was used, and as the continuous phase, a 2% aqueous solution of polyvinyl alcohol (GL-03 manufactured by Nippon Synthetic Chemical Industry Co., Ltd.) was used. For delivering a liquid, one each of a syringe pump (KDS200 by KD Scientific) was used for the dispersion phase and the continuous phase. When the liquid was delivered at a flow rate of 180 ml/hr for the dispersion phase and a flow rate of 270 ml/hr for the continuous phase, the continuous formation of droplets with a uniform size at a regular time interval at all 72 crossroads (144 T-junctions) inside the chip was observed as shown in FIG. 9. The average size of the droplets formed was 95.4 μm with a coefficient of variation of 1.3%.

Specific Example 2

Figure 10:
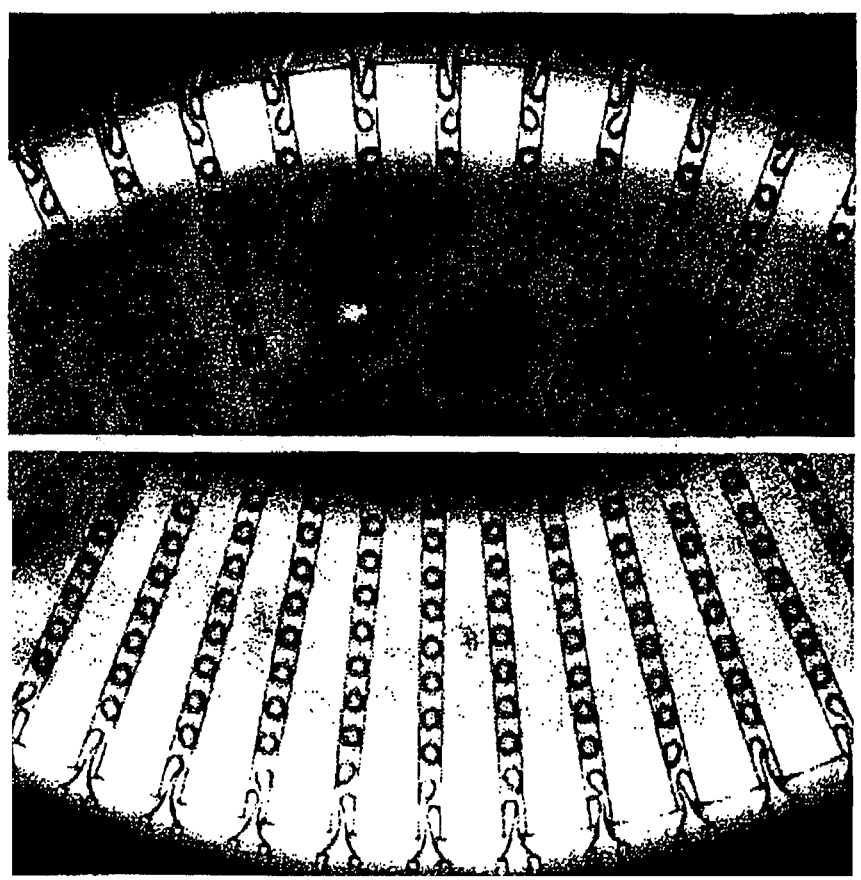
FIG. 10 is a diagram showing how microdroplets are formed.

When a procedure similar to specific example 1 was followed except that the flow rate of the dispersion phase was set at 144 ml/hr, the continuous formation of droplets with a uniform size at a regular time interval was confirmed (FIG. 10). The average size of the droplets formed was 95.2 μm with a coefficient of variation of 1.7%.

Specific Example 3

Figure 14:
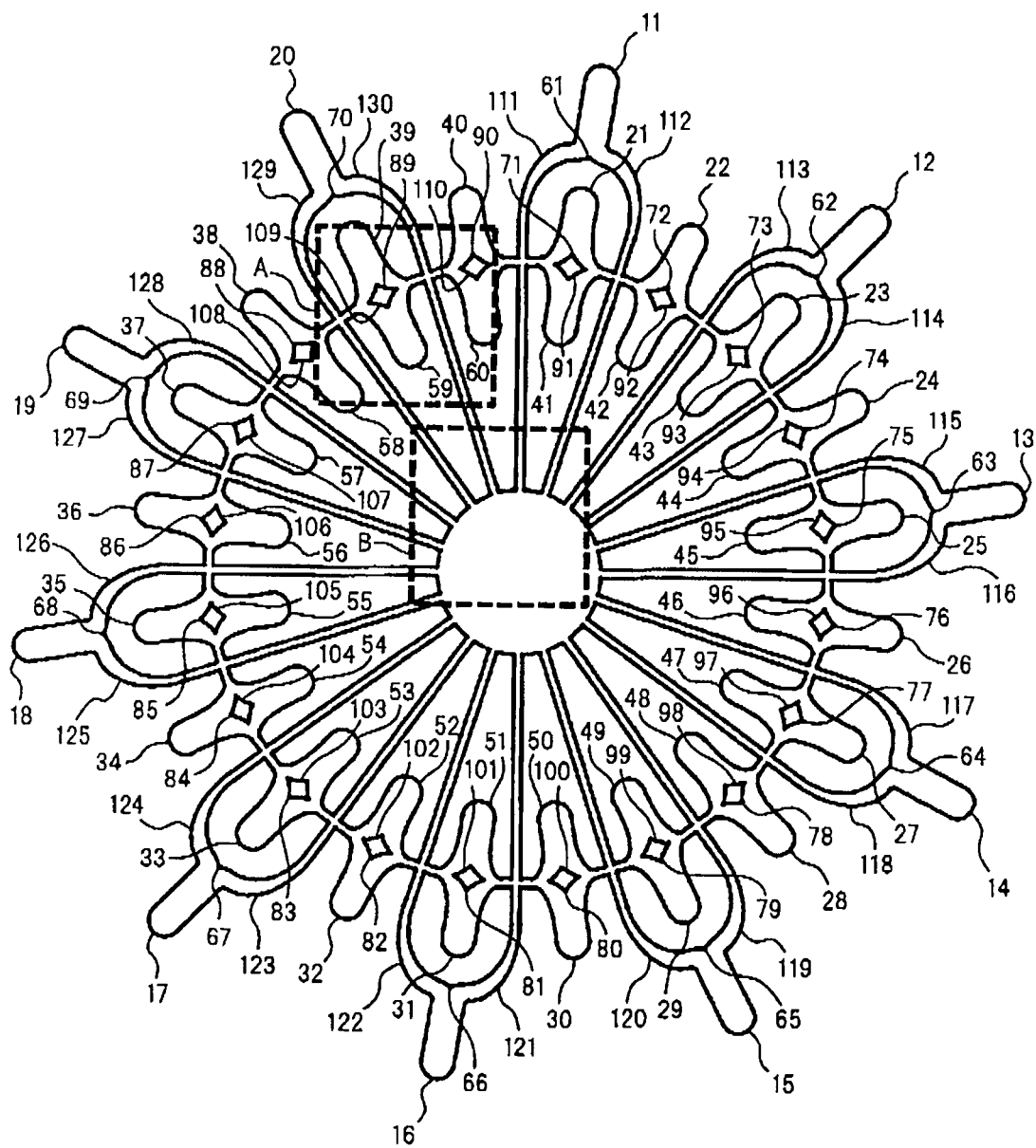
FIG. 14 is a top plan view showing another example of the microchannel structure (chip) of an apparatus for producing microdroplets of the present invention.
Figure 15:
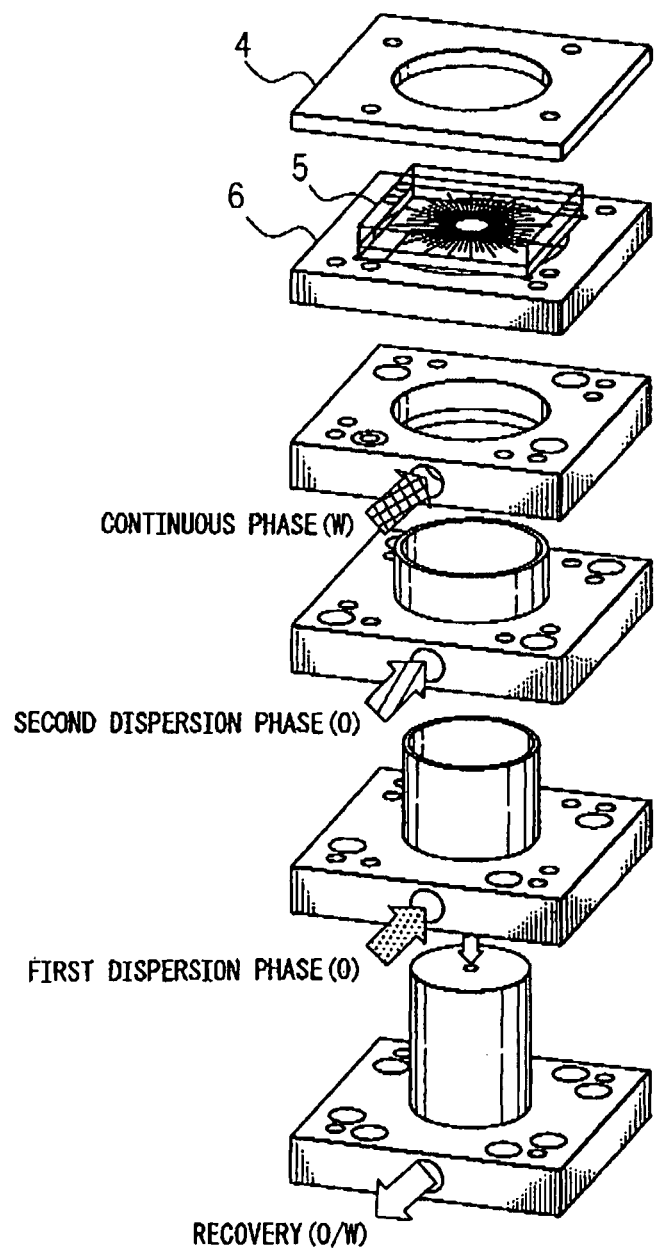
FIG. 15 shows a procedure for mounting a microchannel structure (chip) shown in FIG. 14 to a holder made of stainless steel (SUS 304).

In a manner similar to Specific example 1, a microchannel chip as shown in FIG. 14 was fabricated. As shown in FIG. 15, this was mounted on a stainless steel (SUS 304) holder prepared by machining and used, and 40 T-junctions (100 μm in both width and depth) for forming two-color droplets were disposed. In FIG. 14, 10 represents a microchannel chip, 11 to 20 represent outlet ports for the continuous phase liquid, 61 to 70 represent branching parts for the continuous phase liquid discharged from the outlet ports 11 to 20, and 111 to 130 represent microchannels for the continuous phase liquid that is branched at the branching parts 61 to 70. 21 to 40 represent outlet ports for the second dispersion phase liquid, 71 to 90 represent branching parts for the second dispersion phase liquid discharged from the outlet ports 21 to 40, 41 to 60 represent outlet ports for the first dispersion phase liquid, and 91 to 110 represent branching parts for the first dispersion phase liquid discharged from the outlet ports 41 to 60. At the branching parts 71 to 90 for the second dispersion phase liquid and the branching parts 91 to 110 for the first dispersion phase liquid, microchannels for the second dispersion phase liquid to be branched and microchannels for the first dispersion phase liquid to be branched are branched and formed as in the microchannels 111 to 130 for the continuous phase liquid.

Figure 16:
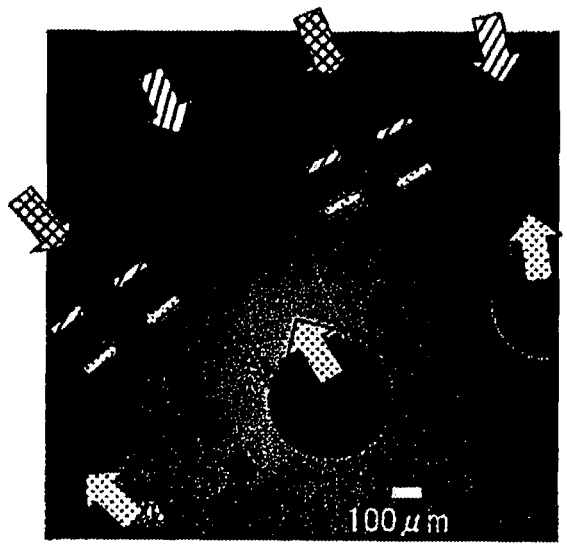
FIG. 16 is an enlarged view of part A of FIG. 14.
Figure 17:
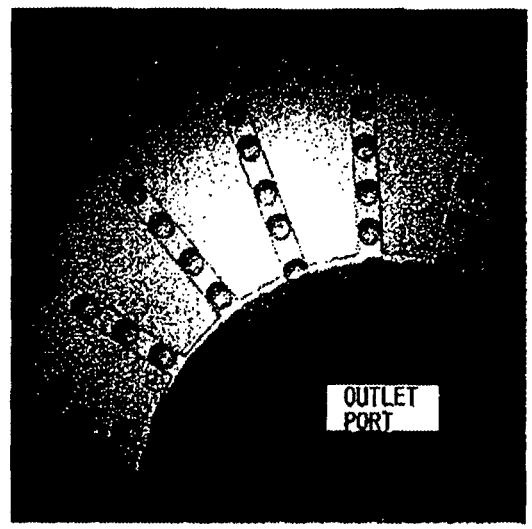
FIG. 17 is an enlarged view of part B of FIG. 14.

An acrylic monomer (colored in red) as the second dispersion phase, silicone oil (colorless) as the first dispersion phase, and a 0.3% by weight aqueous solution of sodium dodecyl sulfate (SDS) as the continuous phase were used. When the liquid was delivered at a flow rate of 10 ml/hr for the first dispersion phase and the second dispersion phase and at a flow rate of 40 ml/hr for the continuous phase, the continuous formation of two-color droplets with a uniform size at a regular time interval was observed at all of 40 T-junctions in the chip (FIGS. 16 and 17). FIGS. 16 and 17 represent an enlarged view of part A and part B of FIG. 14, respectively.

INDUSTRIAL APPLICABILITY

In accordance with the present invention, microdroplets obtained using microchannels that can produce them at low cost, in an efficient manner and in large quantities, and an apparatus for producing microparticles obtained therefrom can be provided.

EXPLANATION OF SIGNS

1: Disperse phase
2: Continuous phase
3: Outlet port
4: Windowed cover
5: Microchannel board

The invention claimed is:

1. An apparatus for producing microdroplets using microchannels,
    said apparatus comprising a microchannel board and a holder for retaining the microchannel board, wherein
    the microchannel board has a microdroplet-outlet port formed at the center thereof, microdroplet-forming parts on a first to a Mth (M is an integer of 1 or more) annular or polygonal peripheries from inside to outside, said parts being connected through the microchannels to the microdroplet-outlet port and a plurality of said parts being disposed on each of M annular or polygonal peripheries with the microdroplet-outlet port at the center, inlet ports for a first liquid disposed on annular or polygonal peripheries with the microdroplet-outlet port at the center, inlet ports for liquids up to a Nth liquid (N is an integer of 2 or more, M≤N−1) sequentially disposed on annular or polygonal peripheries further outside of the above peripheries, and microchannels for feeding the first to the Nth liquids to the above plurality of microdroplet-forming parts, and
    the holder for retaining the microchannel board has a coaxial multitube structure, with the microdroplet-outlet port as the central axis, having N annular or polygonal annular channels for allocating the even flow rate of the above first to the Nth liquids to the inlet port for each liquid of the microchannel board, wherein
    N=2 (simultaneously M=1), the first liquid is a dispersion phase, and the second liquid is a continuous phase, and
    the holder for retaining the microchannel structure has a third component which is disposed under the microchannel board and which is equipped with an inlet port for the continuous phase, a second component which is equipped with an inlet port for the dispersion phase and which forms annular or polygonal annular channels for feeding the continuous phase to the microchannel board in combination with the above third component, and a first component which forms a annular path for feeding the dispersion phase to the microchannel board in combination with the above second component and which is equipped, at the center thereof, with a cylinder having an outlet port for microdroplets from the microchannel board, wherein the first and second components are placed beneath the third component, and the first component is placed beneath the second component.

2. The apparatus for producing microdroplets according to claim 1, wherein the plurality of microdroplet-forming parts are where the dispersion phase liquid alternately joins with the continuous phase liquid from both sides.

3. An apparatus for producing microdroplets using microchannels,
    said apparatus comprising a microchannel board and a holder for retaining the microchannel board, wherein
    the microchannel board has a microdroplet-outlet port formed at the center thereof, microdroplet-forming parts on a first to a Mth (M is an integer of 1 or more) annular or polygonal peripheries from inside to outside, said parts being connected through the microchannels to the microdroplet-outlet port and a plurality of said parts being disposed on each of M annular or polygonal peripheries with the microdroplet-outlet port at the center, inlet ports for a first liquid disposed on annular or polygonal peripheries with the microdroplet-outlet port at the center, inlet ports for liquids up to a Nth liquid (N is an integer of 2 or more, M≤N−1) sequentially disposed on annular or polygonal peripheries further outside of the above peripheries, and microchannels for feeding the first to the Nth liquids to the above plurality of microdroplet-forming parts, and
    the holder for retaining the microchannel board has a coaxial multitube structure, with the microdroplet-outlet port as the central axis, having N annular or polygonal annular channels for allocating the even flow rate of the above first to the Nth liquids to the inlet port for each liquid of the microchannel board, wherein
    N=2 (simultaneously M=1), the first liquid is a continuous phase, and the second liquid is a dispersion phase, and
    the holder for retaining the microchannel structure has a third component which is disposed under the microchannel board and which is equipped with an inlet port for the dispersion phase, a second component which is equipped with an inlet port for the continuous phase and which forms annular or polygonal annular channels for feeding the continuous phase to the microchannel board in combination with the above third component, and a first component which is equipped with an outlet port for the formed droplets from the holder and which forms a annular or polygonal annular channel for feeding the continuous phase to the microchannel board in combination with the above second component and which is equipped, at the center thereof, with a cylinder having an outlet port for microdroplets from the microchannel board, wherein the first and second components are placed beneath the third component, and the first component is placed beneath the second component.

4. The apparatus for producing microdroplets according to claim 3, wherein the plurality of microdroplet-forming parts are where the continuous phase joins with the above dispersion phase from both sides.

* * * * *

UNITED STATES PATENT AND TRADEMARK OFFICE
CERTIFICATE OF CORRECTION

PATENT NO. : 9,200,938 B2
APPLICATION NO. : 13/261564
DATED : December 1, 2015
INVENTOR(S) : Nisisako It is certified that error appears in the above-identified patent and that said Letters Patent is hereby corrected as shown below:

On the title page, item (73)

Delete "Toyota Institute of Technology" and insert -- Tokyo Institute of Technology --.

Signed and Sealed this
Sixteenth Day of August, 2016

Michelle K. Lee
*Director of the United States Patent and Trademark Office*